US009831999B2

(12) United States Patent
Koivisto et al.

(10) Patent No.: US 9,831,999 B2
(45) Date of Patent: Nov. 28, 2017

(54) ENHANCED DISCONTINUED TRANSMISSION AND RECEPTION METHODS

(71) Applicant: Nvidia Corporation, Santa Clara, CA (US)

(72) Inventors: Tommi Koivisto, Helsinki (FI); Tero Kuosmanen, Helsinki (FI); Timo Roman, Helsinki (FI)

(73) Assignee: Nvidia Corporation, Santa Clara, CA (US)

( * ) Notice: Subject to any disclaimer, the term of this patent is extended or adjusted under 35 U.S.C. 154(b) by 156 days.

(21) Appl. No.: 14/707,203

(22) Filed: May 8, 2015

(65) Prior Publication Data

US 2015/0327325 A1    Nov. 12, 2015

Related U.S. Application Data

(60) Provisional application No. 61/990,355, filed on May 8, 2014.

(51) Int. Cl.
*H04W 56/00* (2009.01)
*H04L 5/00* (2006.01)
(Continued)

(52) U.S. Cl.
CPC .............. *H04L 5/0073* (2013.01); *H04L 5/00* (2013.01); *H04L 5/005* (2013.01); *H04L 5/0082* (2013.01);
(Continued)

(58) Field of Classification Search
None
See application file for complete search history.

(56) References Cited

U.S. PATENT DOCUMENTS

| 8,885,739 B2* | 11/2014 | Noh ...................... H04L 1/0026 375/260 |
| 2013/0143502 A1* | 6/2013 | Kazmi .................. H04W 88/06 455/62 |

(Continued)

OTHER PUBLICATIONS

3GPP TSG RAN WG1 Meeting #76bis, Panasonic, entitled "The Procedure for Small Cell On/Off Time Transition (Handover and DRX)", Shenzhen, China Mar. 31-Apr. 4, 2014, R1-141214, 5 pages.

(Continued)

*Primary Examiner* — Jay P Patel
(74) *Attorney, Agent, or Firm* — Kevin Brown; Parker Justiss, P.C.

(57) ABSTRACT

Methods for operating a small cell in a discontinued reception (DRX) mode include maintaining the small cell in a discontinuous transmission (DTX) mode during a first time period having a plurality of first time slots. The methods include transmitting common reference signals in a predetermined number of second time slots prior to the first time slots and in a predetermined number of third time slots following commencement of the first time slots. The methods include discontinuing transmission of the common reference signals and common channel signals if mobile devices are in a discontinuous reception mode during the first time period. The methods include discontinuing transmission of the common reference signals during a predetermined number of fourth time slots following commencement of the first time period if there is no dedicated common transmission to the mobile devices.

20 Claims, 3 Drawing Sheets

(51) Int. Cl.
*H04W 76/04* (2009.01)
*H04W 74/00* (2009.01)
*H04W 84/04* (2009.01)

(52) U.S. Cl.
CPC ......... *H04L 5/0092* (2013.01); *H04W 74/006* (2013.01); *H04W 76/046* (2013.01); *H04W 76/048* (2013.01); *H04W 84/045* (2013.01)

(56) References Cited

U.S. PATENT DOCUMENTS

| | | | | |
|---|---|---|---|---|
| 2013/0210447 A1* | 8/2013 | Moe | ................. | H04W 72/0486 455/453 |
| 2013/0286848 A1* | 10/2013 | Xu | ................... | H04W 52/0225 370/241 |
| 2014/0071931 A1* | 3/2014 | Lee | ....................... | H04L 5/001 370/329 |
| 2014/0133429 A1* | 5/2014 | Chun | ..................... | H04L 5/005 370/329 |
| 2014/0140314 A1* | 5/2014 | Wei | ...................... | H04W 48/12 370/329 |
| 2014/0153448 A1* | 6/2014 | Ribeiro | .................... | H04L 5/14 370/280 |
| 2015/0163801 A1* | 6/2015 | Sadek | ............... | H04W 72/0446 370/336 |
| 2015/0189574 A1* | 7/2015 | Ng | ....................... | H04W 24/08 370/252 |
| 2015/0189613 A1* | 7/2015 | Chen | .................. | H04W 56/004 370/311 |
| 2015/0223149 A1* | 8/2015 | Liu | ...................... | H04W 48/12 370/252 |
| 2015/0223245 A1* | 8/2015 | Cheng | .................. | H04W 48/16 370/329 |
| 2015/0249938 A1* | 9/2015 | Dudda | ............. | H04W 36/0055 370/331 |
| 2015/0271744 A1* | 9/2015 | Liu | ...................... | H04W 24/02 370/329 |
| 2015/0282080 A1* | 10/2015 | Maattanen | ........ | H04W 52/0216 370/311 |
| 2015/0358094 A1* | 12/2015 | Yi | ....................... | H04B 17/318 370/252 |
| 2015/0373628 A1* | 12/2015 | Hwang | ................ | H04W 48/16 370/338 |
| 2016/0006546 A1* | 1/2016 | Yi | ........................... | H04L 5/001 370/329 |
| 2016/0007406 A1* | 1/2016 | Yi | ..................... | H04W 52/0206 370/252 |
| 2016/0029250 A1* | 1/2016 | Yi | ........................ | H04W 48/12 370/329 |
| 2016/0081111 A1* | 3/2016 | Yi | ........................... | H04L 5/001 370/280 |
| 2016/0119970 A1* | 4/2016 | Lee | ..................... | H04W 76/048 370/328 |
| 2016/0128022 A1* | 5/2016 | Park | .................... | H04B 17/345 370/312 |
| 2016/0212650 A1* | 7/2016 | Zheng | .................. | H04W 24/10 |
| 2016/0227602 A1* | 8/2016 | Yi | ........................ | H04W 48/16 |
| 2016/0278101 A1* | 9/2016 | Soldati | ................ | H04J 11/0056 |

OTHER PUBLICATIONS

3GPP TSG RAN WG1 Meeting #62, Huawei, CATR, HiSilicon entitled "New WI proposal: Small cell enhancements—Physical layer aspects" Busan, Korea Dec. 3-6, 2013, RP-132073, 7 pages.

3GPP TSG-RAN WG1 #76bis, MediaTek Inc., HiSilicon entitled "On CA enhancements for fast small cell on/off operation" Busan, Shenzhen, China, Mar. 31th-Apr. 4th, 2014, R1-141483, 3 pages.

3GPP TSG-RAN WG1 Meeting #76bis, Ericsson, entitled "On Transition Time Reduction for Small Cell On/Off", Shenzhen, China, Mar. 31st-Feb. 4th, 2014, R1-141640, 6 pages.

3GPP TSG-RAN WG1 #76bis, NVIDIA, entitled "Procedures for reducing small cell on/off transition time", Shenzhen, China, Mar. 31st-Apr. 4th, 2014, R1-141513, 5 pages.

3GPP TSG-RAN WG1 #76, Qualcomm Incorporated, entitled "Small cell on/off time reduction", Feb. 10th-Feb. 14th, 2014, Prague, Czech Republic, R1-140452, 5 pages.

3GPP TSG RAN WG1 #76bis, Motorola Mobility, entitled "Further discussion on procedures for small cell On/Off", 31 Shanzhen, China, Mar.-Apr. 4, 2014, R1-141609, 5 pages.

3GPP TSG-RAN WG1 #76bis, Qualcomm Incorporated, entitled "Small cell on/off time reduction", Mar. 31st-Apr. 4th, 2014, Shenzhen, China, R1-141441, 5 pages.

3GPP TSG RAN WG1 Meeting #76, Ericsson, entitled "On Small cell on/off and the New L1 procedure", Prague, Czech Republic, Feb. 10th-14th, 2014, R1-140758, 5 pages.

* cited by examiner

ENHANCED DISCONTINUED TRANSMISSION AND RECEPTION METHODS

CROSS-REFERENCE TO RELATED APPLICATION

This application claims the benefit of U.S. Provisional Application Ser. No. 61/990,355, filed by Koivisto, et al. on May 8, 2014, entitled "Enhanced Discontinued Transmission and Reception Methods," commonly assigned with this application and incorporated herein by reference.

TECHNICAL FIELD

The present disclosure is directed, in general, to wireless communication, and more particularly to enhanced discontinued transmission and reception methods.

BACKGROUND

In a typical 3GPP network, small cells continuously broadcast information on Cell Broadcast (CB) channels such as, for example, common channels and signals which may include common reference signals (CRS). Mobile devices (also referred to herein as mobile terminals) listen to cell broadcast information on CB channels. Common reference signals also allow the mobile devices to synchronize themselves in time and frequency to the small cells as well as maintain automatic gain control (AGC) levels for adequate reception of signals. Mobile devices also monitor for the downlink control channel (PDCCH) or enhanced downlink control channel (EPDCCH) for detecting downlink control information (DCI). (THIS IS BACKGROUND INFORMATION . . . )

Since the small cells continuously broadcast information, the small cells consume significant amount of power. Also, continuous broadcast of common channels and signals causes signal interference.

Accordingly, improved methods and systems for operating small cells are desired which will provide reduction of power consumption and reduction of interference.

SUMMARY

Various disclosed embodiments are directed to methods for operating a small cell in a discontinued transmission (DTX) mode and for operating mobile devices in a discontinuous reception (DRX) mode. The method includes maintaining the small cell in a discontinuous transmission state during a first time period having a plurality of first time slots. The method includes transmitting common reference signals in a predetermined number of second time slots prior to the first time slots and in a predetermined number of third time slots following commencement of the first time slots.

The method includes discontinuing transmission of the common reference signals and common channel signals if mobile devices are in a DRX state during the first time period. The method includes discontinuing transmission of the common reference signals during a predetermined number of fourth time slots following commencement of the first time period if there is no dedicated transmission to the mobile devices.

According to disclosed embodiments, a method operates a mobile device in a discontinuous reception (DRX) mode. The mobile device identifies time slots containing common reference signals from the DRX configuration. The method includes receiving common reference signals in a predetermined number of second time slots prior to first time slots and in a predetermined number of third time slots following commencement of the first time slots. The method includes monitoring a physical downlink control channel (PDCCH) or an enhanced physical downlink control channel (EPDCCH) for downlink control information (DCI) in the first time slots. The method includes verifying the common reference signals by decoding DCI in a predetermined number of fourth time slots following commencement of the first time slots.

BRIEF DESCRIPTION

Reference is now made to the following descriptions taken in conjunction with the accompanying drawings, in which.

DETAILED DESCRIPTION

Figure 1:
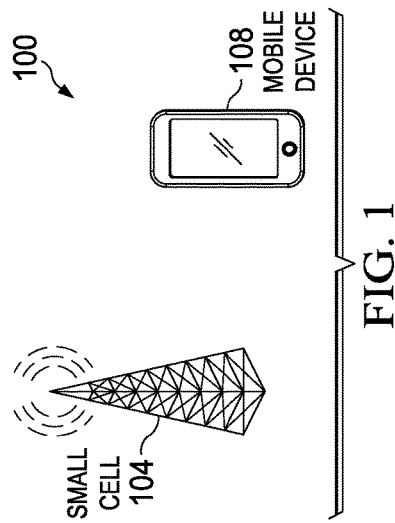
FIG. 1 illustrates a wireless network in which embodiments of the disclosure may be implemented.

FIGS. 1-6, discussed below, and the various embodiments used to describe the principles of the present disclosure are by way of illustration only and should not be construed in any way to limit the scope of the disclosure. Those skilled in the art will recognize that the principles of the disclosure may be implemented in any suitably arranged device or a system. The numerous innovative teachings of the present disclosure will be described with reference to exemplary non-limiting embodiments According to disclosed embodiments, a method includes operating a small cell (also known as base station or eNodeB) in a wireless communication network in a discontinued transmission (DTX) mode. The small cell is periodically turned off to reduce electrical power consumption and to reduce interference.

According to the disclosed embodiments, the mobile devices in the network are operated in a discontinued reception (DRX) mode. The mobile devices maintain time and frequency synchronization with the small cell and maintain automatic gain control (AGC) levels for adequate reception of signals.

According to aspects of the embodiments, the small cells in the network are turned off when there is no traffic (i.e., no active mobile devices), thus saving energy. Also, by turning off the small cells, interference is reduced due to reduced common channel broadcasts.

According to disclosed embodiments, mobile devices in the network receive a long DRX configuration from the small cell. The long DRX configuration enables the mobile devices to determine time slots and frames that contain common reference signals (CRS), thus enabling the mobile devices to maintain time and frequency synchronization with the small cell.

According to disclosed embodiments, in time slots during a DRX off state, the mobile devices do not expect CRS transmission from the small cell. In $N_1$ time slots before the start of a DRX active time and in $N_2$ time slots after the start of a DRX active time, the mobile devices expect CRS transmission from the small cell. According to certain disclosed embodiments, $N_2$ may be zero. The mobile devices monitor physical downlink control channel (PDCCH) or enhanced physical downlink control channel (EPDCCH) in time slots during DRX active time for downlink control information (DCI) messages. The mobile devices verify the presence of CRS transmission by successfully decoding DCI messages in $N_{2+1}$ time slots after the start of DRX active time.

According to disclosed embodiments, the mobile devices utilize the CRS to estimate correct AGC level and time and frequency offset compensation. Thus, the mobile devices are able to track the small cell based on the CRS.

According to disclosed embodiments, the mobile devices track the small cells utilizing known time slots containing the CRS. The mobile devices use per-time slot tracking information for demodulation of downlink physical channels in the time slot.

According to disclosed embodiments, per-time slot tracking information is stored only when DCI is successfully decoded by the mobile devices. If the DCI information is not successfully decoded in a time slot, the mobile devices rely on the last valid decoded tracking information. Thus, the mobile devices rely on decoded tracking information received in either $N_1+N_2$ time slots or in the latest time slots with valid decoded DCI.

According to disclosed embodiments, irrespective of the DRX state, the small cells periodically transmit discovery signals. The small cells configure each radio resource control (RRC) connected mode mobile device with a long DRX configuration. If all mobile devices are in a DRX off state, the small cells may turn off CRS and common channel transmission.

According to disclosed embodiments, $N_1$ time slots before and $N_2$ time slots after the start of DRX active time of the mobile devices, the small cells transmit CRS. Also, $N_2+1$ time slots after the start of DRX active time, the small cells may skip transmission of CRS if there is no dedicated transmission to the mobile devices in that time slot.

According to disclosed embodiments, the mobile devices may be configured with a short DRX cycle. Similar to the long DRX cycle, there may be a fixed period of CRS transmission $M_1$ time slots before and $M_2$ time slots after the start of the DRX active time. According to disclosed embodiments, $M_1$ and $M_2$ may equal zero.

FIG. 1 illustrates wireless network 100 in which embodiments of the invention may be implemented. Network 100 includes a small cell 104 which periodically transmits cell broadcast information including discovery signals. Mobile device 108 receives the cell broadcast in accordance with the aforementioned methods. In accordance with the disclosed embodiments, the mobile device 108 is configured to operate in a DRX state. The small cell 104 is periodically turned off to reduce power consumption and to reduce interference. The mobile device 108 maintains time and frequency synchronization with the small cell 104 and maintains adequate automatic gain control (AGC) level necessary for signal reception from the small cells 104.

Figure 2:
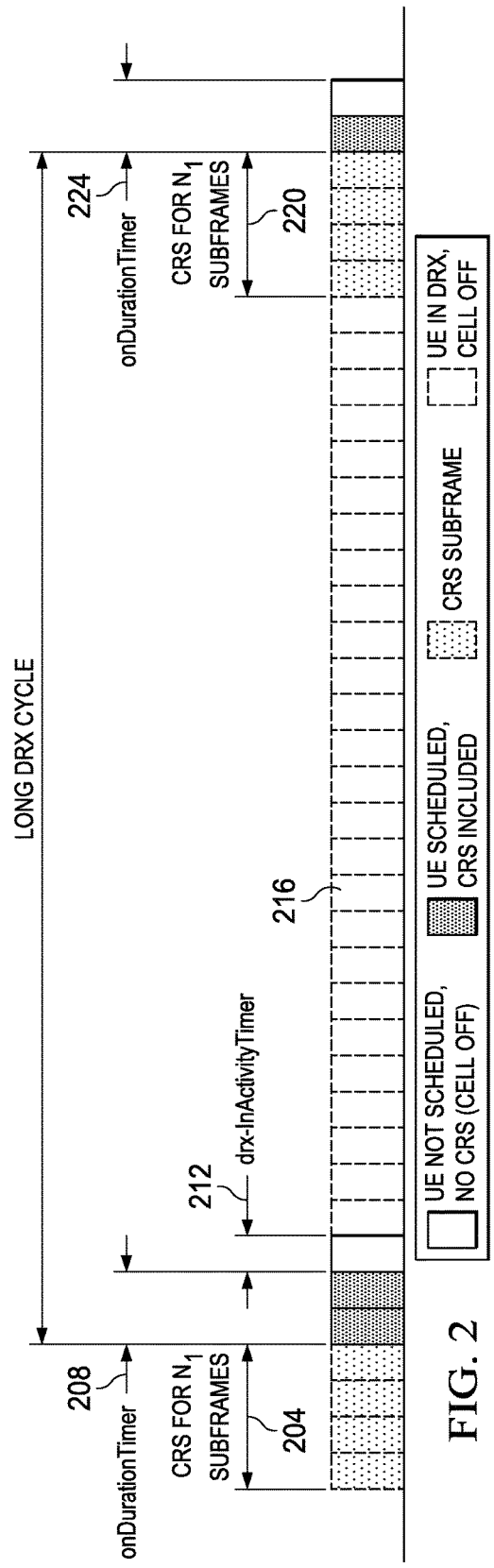
FIGS. 2-4 are timing diagrams illustrating time slots according to disclosed embodiments.

FIG. 2 is a timing diagram illustrating time slots for operating in a long DRX configuration according to disclosed embodiments. In time slots 204 ($N_1$ time slots), CRS is transmitted. In time slots 208, the mobile devices are scheduled and CRS is transmitted. In time slot 212, the mobile devices are not scheduled but remain in an active DRX state. So CRS is not transmitted in time slot 212. (TIME SLOTS 204 AND 208 ARE SHOWN IN FIG. 2. PLEASE SEE FIG. 2)

In time slots 216, the mobile devices are in a DRX state and the small cells remain off. In time slots 220 ($N_1$ time slots), CRS is transmitted. In time slot 224, the mobile devices are scheduled and CRS is transmitted.

As shown in FIG. 2, $N_1=4$ and $N_2=0$. The mobile devices maintain time and frequency tracking based on $N_1=4$ time slots. Additionally, the mobile devices maintain time and frequency tracking based on other time slots in which the mobile devices are scheduled and successfully receives a valid DL signal since those time slots also contain CRS. During time slots in which the mobile devices are in DRX state, the receiver of the mobile devices may be turned off.

Figure 3:
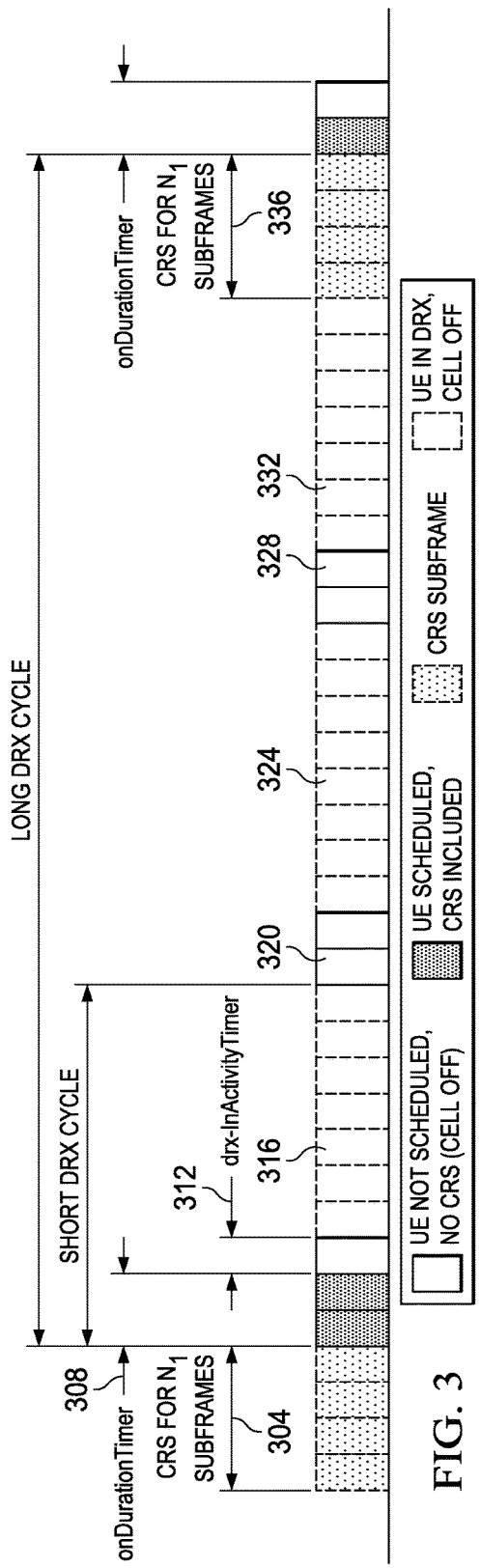

FIG. 3 is a timing diagram illustrating time slots for operating in a short DRX configuration in accordance with disclosed embodiments. In time slots 304 ($N_1$ time slots), CRS is transmitted. In time slots 308, the mobile devices are scheduled and CRS is transmitted. In time slots 312, 320 and 328 the mobile devices are in active DRX time but are not scheduled. In time slots 316, 324 and 332, the mobile devices are in a DRX state and the small cells are turned off. In time slot 336, CRS is transmitted.

Figure 4:
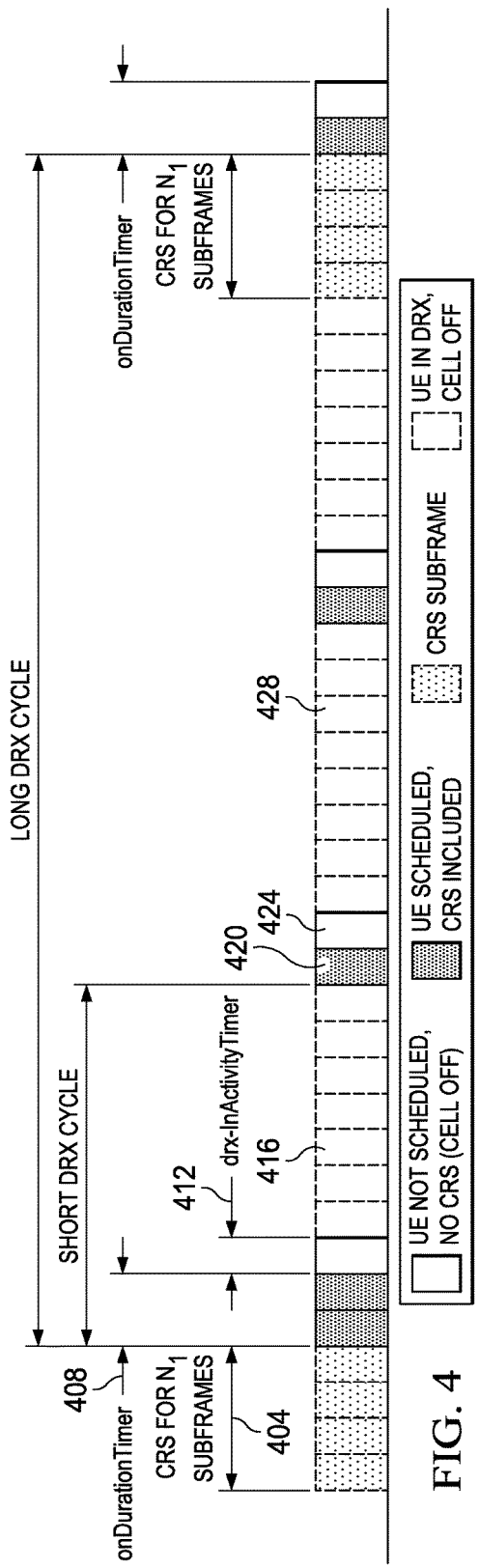

FIG. 4 is a timing diagram illustrating time slots for operating in a short DRX configuration in accordance with other disclosed embodiments. In time slots 404 ($N_1$ time slots), CRS is transmitted. In time slots 408, the mobile devices are scheduled and CRS is transmitted. In time slots 412, 424 the mobile devices are in active DRX time but are not scheduled. In time slots 416, 428, the mobile devices are in a DRX state and the small cells are turned off. In time slot 420, the mobile devices are in active DRX time and are scheduled, and CRS is transmitted.

Figure 5:
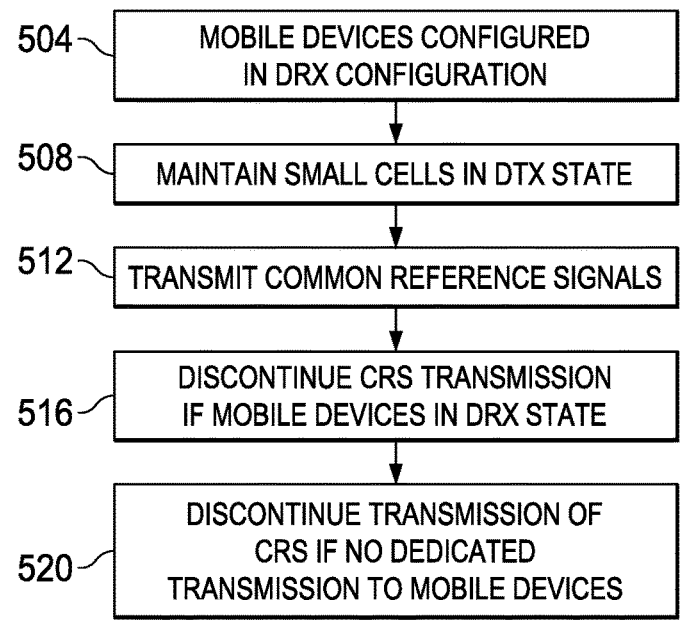
FIGS. 5-6 are flowcharts processes according to disclosed embodiments.

FIG. 5 is a flowchart of a process according to disclosed embodiments. Such a process can be performed by any apparatus configured to perform a process as described.

In block 504, mobile devices in a radio resource control (RRC) mode are configured with a DRX configuration.

In block 508, the small cells are in a discontinuous transmission (DTX) state during a first time period having a plurality of first time slots.

In block 512, the small cells transmit common reference signals (CRS) in a predetermined number of second time slots prior to the first time slots and in a predetermined number of third time slots following commencement of the first time slots. In block 516, the small cells discontinue transmission of the common reference signals and common channel signals if mobile devices are in a DRX state during the first time slots.

Figure 6:
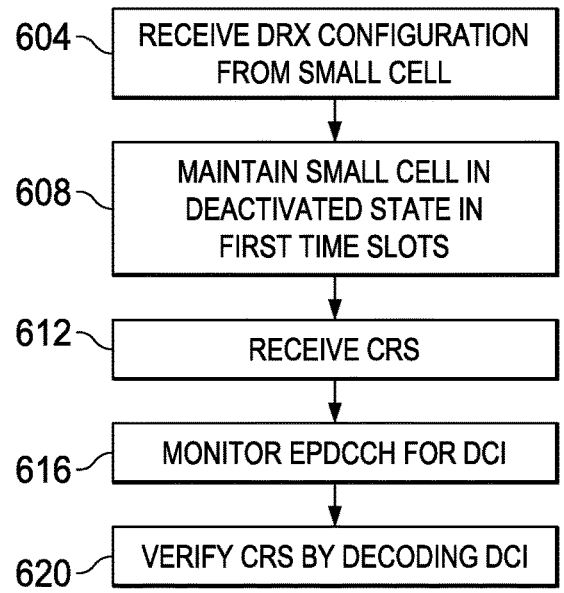

In block 520, the small cells discontinue transmission of the common reference signals during a predetermined number of fourth time slots following commencement of the first time period if there is no dedicated common transmission to the mobile devices. FIG. 6 is a flowchart of a process according to disclosed embodiments. In block 604, the mobile device receives a DRX configuration from the small cell. The mobile device identifies time slots containing common reference signals (CRS) from the DRX configuration. In block 608, the small cell is maintained in a discontinuous transmission state during a first time period having a plurality of first time slots.

In block 612, the mobile device receives common reference signals in a predetermined number of second time slots prior to the first time slots and in a predetermined number of third time slots following commencement of the first time slots.

In block 616, the mobile device monitors a physical downlink control channel (PDCCH) or an enhanced physical downlink control channel (EPDCCH) for downlink control information (DCI) in the first time slots. In block 620, the mobile device verifies the presence of common reference signals by decoding DCI in a predetermined number of fourth time slots following commencement of the first time slots.

According to disclosed embodiments, a non-transitory computer-readable medium is encoded with computer-executable instructions for operating a small cell in a discontinued transmission state at predetermined time periods. The computer-executable instructions when executed cause at least one data processing system to: maintain the small cell in a discontinuous transmission state during a first time period having a plurality of first sub-frames; transmit common reference signals in a predetermined number of second sub-frames prior to the first sub-frames and in a predetermined number of third subframes following commencement of the first sub-frames; discontinue transmission of the common reference signals and common channel signals if mobile devices are in a DRX state during the first time period; and discontinue transmission of the common reference signals during a predetermined number of fourth sub-frames following commencement of the first time period if there is no dedicated transmission to the mobile devices.

According to disclosed embodiments, a non-transitory computer-readable medium is encoded with computer-executable instructions for operating a mobile device in a cellular network wherein a small cell operates in a discontinued transmission state at predetermined time periods. The computer-executable instructions when executed cause at least one mobile device to: receive a DRX configuration from the small cell, wherein the mobile device identifies time slots potentially containing common reference signals from the DRX configuration; receive common reference signals in a predetermined number of second time slots prior to the first time slots and in a predetermined number of third time slots following commencement of the first time slots; monitor a physical downlink control channel (PDCCH) or an enhanced physical downlink control channel (EPDCCH) for downlink control information (DCI) in the first time slots; and verify the presence of common reference signals by decoding DCI in a predetermined number of fourth time slots following commencement of the first time slots.

Those skilled in the art will recognize that, for simplicity and clarity, the full structure and operation of all systems suitable for use with the present disclosure is not being depicted or described herein. Instead, only so much of a system as is unique to the present disclosure or necessary for an understanding of the present disclosure is depicted and described. The remainder of the construction and operation of the disclosed systems may conform to any of the various current implementations and practices known in the art.

Of course, those of skill in the art will recognize that, unless specifically indicated or required by the sequence of operations, certain steps in the processes described above may be omitted, performed concurrently or sequentially, or performed in a different order. Further, no component, element, or process should be considered essential to any specific claimed embodiment, and each of the components, elements, or processes can be combined in still other embodiments.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Those skilled in the art to which this application relates will appreciate that other and further additions, deletions, substitutions and modifications may be made to the described embodiments.

What is claimed is:

1. A method for operating a small cell, comprising:
   maintaining the small cell in a discontinuous transmission state during a first time period having a plurality of first time slots;
   transmitting common reference signals in a predetermined number of second time slots prior to the first time slots and in a predetermined number of third time slots following commencement of the first time slots; and
   discontinuing transmission of the common reference signals and common channel signals if mobile devices are in a discontinuous reception state during the first time period.

2. The method of claim 1, further comprising discontinuing transmission of the common reference signals during a predetermined number of fourth time slots following commencement of the first time period if there is no dedicated transmission to the mobile devices.

3. The method of claim 1, configuring the mobile devices in a radio resource control (RRC) mode with a DRX configuration.

4. The method of claim 1, wherein the discontinued reception configuration identifies time slots containing the common reference signals.

5. The method of claim 1, further comprising transmitting discovery signals periodically.

6. The method of claim 1, wherein the number of third time slots is zero.

7. The method of claim 1, wherein the mobile devices synchronizes time and frequency based on the common reference signals.

8. A method for operating a mobile device in a cellular network wherein a small cell operates in a discontinued transmission mode at predetermined time periods, comprising:
   receiving a discontinued reception configuration from the small cell, wherein the mobile device identifies time slots which may contain common reference signals from the discontinued reception configuration;
   receiving common reference signals in a predetermined number of second time slots prior to first time slots and in a predetermined number of third time slots following commencement of the first time slots; and
   monitoring a physical downlink control channel (PDCCH) or an enhanced physical downlink control channel (EPDCCH) for downlink control information (DCI) in the first time slots.

9. The method of claim 8, further comprising verifying the presence of common reference signals by decoding DCI in a predetermined number of fourth time slots following commencement of the first time slots.

10. The method of claim 8, further comprising synchronizing time and frequency based on the common reference signals.

11. The method of claim 8, further comprising rejecting time, frequency and automatic gain control in a sub-frame if valid downlink control information (DCI) is not received in that time slot.

12. The method of claim 11 further comprising using time, frequency and automatic gain control in a sub-frame if valid downlink control information (DCI) is received in that time slot.

13. The method of claim 8, wherein the second time slots are before a start of discontinued reception active time of the mobile device.

14. A non-transitory computer-readable medium encoded with computer-executable instructions for operating a small cell, wherein the computer-executable instructions when executed cause at least one data processing system to:
  maintain the small cell in a discontinuous transmission state during a first time period having a plurality of first time slots;
  transmit common reference signals in a predetermined number of second time slots prior to the first time slots and in a predetermined number of third time slots following commencement of the first time slots; and
  discontinue transmission of the common reference signals and common channel signals if mobile devices are in a discontinuous reception state during the first time period.

15. The non-transitory computer-readable medium of claim 14, wherein the computer-executable instructions when executed cause at least one data processing system to:
  discontinue transmission of the common reference signals during a predetermined number of fourth time slots following commencement of the first time period if there is no dedicated transmission to the mobile devices.

16. The non-transitory computer-readable medium of claim 14, wherein the mobile devices in a radio resource control (RRC) mode are configured with a DRX configuration.

17. The non-transitory computer-readable medium of claim 14, wherein discovery signals are transmitted periodically.

18. The non-transitory computer-readable medium of claim 14, wherein the number of third sub-frames is zero.

19. A non-transitory computer-readable medium encoded with computer-executable instructions for operating a mobile device in a cellular network wherein a small cell operates in a discontinued transmission state at predetermined time periods, wherein the computer-executable instructions when executed cause at least one mobile device to:
  receive a discontinued reception (DRX) configuration from the small cell, wherein the mobile device identifies time slots containing common reference signals from the DRX configuration;
  receive common reference signals in a predetermined number of second time slots prior to first time slots and in a predetermined number of third time slots following commencement of the first time slots; and
  monitor a physical downlink control channel (PDCCH) or an enhanced physical downlink control channel (EPDCCH) for downlink control information (DCI) in the first time slots.

20. The non-transitory computer-readable medium of claim 19, wherein the computer-executable instructions when executed cause at least one data processing system to:
  verify the presence of common reference signals by decoding DCI in a predetermined number of fourth sub-frames following commencement of the first time slots.

* * * * *